United States Patent
Miller et al.

(10) Patent No.: US 8,236,235 B2
(45) Date of Patent: Aug. 7, 2012

(54) REMOVABLE NOZZLE FOR USE WITH AIR CANNONS AND AERATORS AND METHOD FOR REPLACING SAME

(75) Inventors: Travis J. Miller, Sheffield, IL (US); Bradley E. Pronschinske, Kewanee, IL (US); Michael J. Masterson, Bradford, IL (US); Martin A. Yepsen, Kewanee, IL (US)

(73) Assignee: Martin Engineering Company, Neponset, IL (US)

( * ) Notice: Subject to any disclaimer, the term of this patent is extended or adjusted under 35 U.S.C. 154(b) by 1015 days.

(21) Appl. No.: 12/105,033

(22) Filed: Apr. 17, 2008

(65) Prior Publication Data

US 2008/0265066 A1    Oct. 30, 2008

Related U.S. Application Data

(60) Provisional application No. 60/914,328, filed on Apr. 27, 2007.

(51) Int. Cl.
  *C21B 7/16*    (2006.01)
(52) U.S. Cl. ........ 266/265; 141/387; 141/392; 137/592; 110/182.5
(58) Field of Classification Search ................... 141/384, 141/387, 392; 266/265; 39/282, 289; 137/592; 110/182.5; 239/282, 289
  See application file for complete search history.

(56) References Cited

U.S. PATENT DOCUMENTS

| | | | | |
|---|---|---|---|---|
| 1,773,944 A | * | 8/1930 | Brakeman | 122/6.6 |
| 2,454,892 A | * | 11/1948 | Sprow | 266/266 |
| 3,784,107 A | | 1/1974 | Rossi | |
| 3,946,949 A | | 3/1976 | Rossi | |

(Continued)

FOREIGN PATENT DOCUMENTS

DE    4009301 C1    5/1991

(Continued)

OTHER PUBLICATIONS

Extended European Search Report and Search Opinion for European Patent Application No. 08746430.1-2308 in the name of Martin Engineering Company, issued on Nov. 30, 2010, 7 pages.

(Continued)

*Primary Examiner* — Gregory Huson
*Assistant Examiner* — Jason K Niesz
(74) *Attorney, Agent, or Firm* — Thompson Coburn LLP; Clyde L. Smith (57) ABSTRACT

A nozzle for introducing pressurized fluids into an industrial vessel is releasably attachable to and detachable from a mounting member securedly attached to an exterior surface of the vessel. The mounting member is attached, via extension piping, to a source of pressurized gas, such as the exhaust valve of an air cannon. Both the nozzle and the mounting member include respective mating collars which engage each other in a twist lock manner. Additional securing members are provided to securely retain the nozzle and mounting member in twist lock engagement. Removal of the nozzle is performed by releasing the securing members, twisting the nozzle from inside of the vessel to unlock it from the mounting member, and uncoupling the nozzle from the mounting member. Installation of a replacement nozzle is performed by performing the foregoing steps in the reverse order. For high temperature applications, the removal of existing refractory material may be necessary prior to removal of a worn nozzle, and new refractory material may be applied to the interior surface of the vessel following attachment of the replacement nozzle.

9 Claims, 6 Drawing Sheets

U.S. PATENT DOCUMENTS

| | | |
|---|---|---|
| 4,451,232 A | 5/1984 | Ernst et al. |
| 4,540,361 A | 9/1985 | Gagne |
| 5,326,036 A | 7/1994 | Wilger |
| 6,032,870 A | 3/2000 | Simoens |

FOREIGN PATENT DOCUMENTS

| | | |
|---|---|---|
| EP | 1112947 A2 | 7/2001 |
| GB | 2218174 A | 11/1989 |
| WO | 96/21132 A1 | 7/1996 |
| WO | 96/33380 A1 | 10/1996 |
| WO | 97/12683 | 4/1997 |

OTHER PUBLICATIONS

Office Action for Canadian Patent Application No. 2,685,197 entitled "Removable Nozzle for Use with Air Cannons and Aerators" in the name of Martin Engineering Company, dated May 2, 2012, 3 pages.

* cited by examiner

REMOVABLE NOZZLE FOR USE WITH AIR CANNONS AND AERATORS AND METHOD FOR REPLACING SAME

CROSS-REFERENCE AND PRIORITY CLAIM TO RELATED PATENT APPLICATION

This patent application claims priority to provisional patent application Ser. No. 60/914,328, entitled "Removable Nozzle for Use With Cannons and Aerators and Method for Replacing Same", filed Apr. 27, 2007, the entire disclosure of which is incorporated herein by reference.

FIELD OF THE INVENTION

The present invention relates, in general, to the removal of flowable materials that has coagulated or caked in an area of a material handling system, and, more specifically, to nozzles for introducing pressurized fluids, such as gasses discharged by air cannons or aerators, into the interior of a vessel of a material handling system.

BACKGROUND OF THE INVENTION

Air cannons and other aeration equipment are often employed in association with material handling vessels in order to supply a discharge of compressed air to the vessel, so as to dislodge buildups and enhance the flow of material within the vessels. An air cannon stores a large volume of air or other gas under pressure in a pressure tank and then quickly releases the air into the material handling vessel, such that the blast of air causes any obstructing material therein to dislodge, thereby enabling the material to flow freely. Industrial applications where air cannons are commonly employed include coal-fired electric generating facilities; coal, metallic, and non-metallic mineral mines; steel mills and foundries; pulp and paper mills; grain, food, and chemical processing operations; aggregate, cement, and concrete producers; and bulk transportation facilities.

Generally, an air cannon's outlet valve is connected, via intermediate extension piping and associated flanges, to a discharge nozzle. The discharge nozzle has an inlet port accessible from the outside of the material handling vessel, and an outlet port positioned inside of the vessel, to distribute the gas released from the air cannon into the vessel's interior.

Depending upon the material handling application, air cannon nozzles can be subject to extreme environmental conditions. For example, one application of air cannons is in the manufacture of cement, where air cannons are employed, for example, in pre-heater towers, to maintain the flow of material through a series of vertical cyclone chambers, as the raw material passes on its way to a kiln and subsequent clinker cooler. As many as one hundred or more individual air cannons, and associated nozzles, may be employed in conjunction with a single pre-heater tower. Inside the cyclone chambers of the pre-heater tower, air cannon nozzles may be exposed to temperatures in excess of 2,500 degrees Fahrenheit for sustained periods of time. Moreover, at the same time, these nozzles are also in contact with caustic chemicals and materials. As a result, air cannon nozzles in such applications become worn over time, and must be periodically replaced. In addition to pre-heater towers, air cannon nozzles are commonly used in other high temperature environments, such as the clinker coolers employed in cement manufacture, and the lime kilns employed in the manufacture of calcium oxide, commonly known as quicklime.

With prior art air cannon nozzles, periodic replacement of the nozzles can be a significantly time consuming and costly undertaking, particularly when, as mentioned above, a single pre-heater tower at a cement plant may have in excess of one hundred nozzles in need of replacement, as may occur during a scheduled annual maintenance shutdown. In such environments, removal of a single prior art nozzle requires: 1) the separation of the air line from the air cannon; 2) the separation of the air cannon itself, including the exhaust valve and associated pressure tank, from an extension pipe coupling the exhaust valve to the nozzle; 3) the separation of the extension pipe from the nozzle; 4) the removal of worn refractory material from a region of the interior of the vessel surrounding the nozzle; and 5) the separation of the nozzle from the wall of the vessel. Subsequent attachment of a replacement prior art nozzle then requires: 1) one person to hold the nozzle from inside of the vessel, while another tacks the nozzle into place (since mounting orientation of the nozzle may be critical, several attempts at positioning and repositioning of the nozzle may be required to correctly position the nozzle; 2) welding the nozzle to the vessel; 3) welding the extension pipe to the nozzle; 4) attaching the air cannon to the extension pipe; and 5) reattaching the air line to the air cannon.

Accordingly, it is an object of the present invention to provide an air cannon nozzle which is easier and hence less costly to replace, once installed in association with an air cannon and a material handling vessel.

It is another object of the present invention of the present invention to provide an air cannon nozzle which is suitable for use in both ambient and high temperature environments.

It is yet another object of the present invention to provide an air cannon nozzle which is capable of withstanding high temperature environments for prolonged periods of time.

These and other objects and features of the present invention will become apparent in view of the present specification, drawings and claims.

BRIEF SUMMARY OF THE INVENTION

The present invention comprises a nozzle assembly for discharging a pressurized gas into an interior of a vessel. The nozzle assembly comprises a mount, or mounting member, fixedly attachable to an exterior portion of the vessel, and an associated replaceable nozzle having a discharge port for discharging the pressurized gas into the interior of the vessel. At least a portion of the replaceable nozzle is releasably attachable to at least a portion of the mounting member from a position interior to the vessel.

At least one of the mounting member and the replaceable nozzle has an inlet port for receiving the pressurized gas. In a preferred embodiment, it is the mounting member that has the inlet port for receiving the pressurized gas.

Moreover, in a preferred embodiment, at least a portion of the replaceable nozzle is releasably attachable to at least a portion of the mounting member by twist-lock engagement of at least a portion of the replaceable nozzle with at least a portion of the mounting member. The mounting member preferably includes a first, male mating collar and the nozzle includes a second, female mating collar, and it is the first and second mating collars of the mounting member and replaceable nozzle, respectively, which are releasably attachable to each other by twist lock engagement.

The nozzle assembly preferably includes at least one securing member releasably securing the replaceable nozzle to the mounting member. The securing member is repositionable from a securing position, wherein the nozzle is securely attached to the mounting member, to a releasing position, wherein the nozzle is released from secure attachment to the mounting member. The at least one securing member preferably comprises at least one bolt threadedly received by at least a portion of at least one of the nozzle and the mounting member.

In a preferred embodiment, at least a portion of the replaceable nozzle is constructed of at least one of a ceramic material or a refractory material. Moreover, at least a portion of the nozzle is also constructed of a metallic material, such as stainless steel.

The present invention also comprises a method of replacing a nozzle of a nozzle assembly disposed within a vessel. A nozzle assembly is provided. The nozzle assembly has a mounting member fixedly attached to an exterior portion of the vessel, and a replaceable nozzle, with at least a portion of the replaceable nozzle being disposed inside of the vessel. At least a portion of the replaceable nozzle is releasably attached to at least a portion of the mounting member. Moreover, at least one of the mounting member and the replaceable nozzle having an inlet port coupled to a source of pressurized gas.

The replaceable nozzle is detached from the mounting member while leaving the mounting member fixedly attached to an exterior portion of the vessel. Next, a replacement nozzle is attached to the mounting member.

In a preferred embodiment, at least a portion of the replaceable nozzle is in twist lock engagement with at least a portion of the mounting member prior to detaching the nozzle. The replaceable nozzle is detaching from twist lock engagement with the mounting member while leaving the mounting member fixedly attached to an exterior portion of the vessel. A replacement nozzle is placed into twist lock engagement with the mounting member from the interior portion of the vessel.

DETAILED DESCRIPTION OF THE INVENTION

Figure 1:
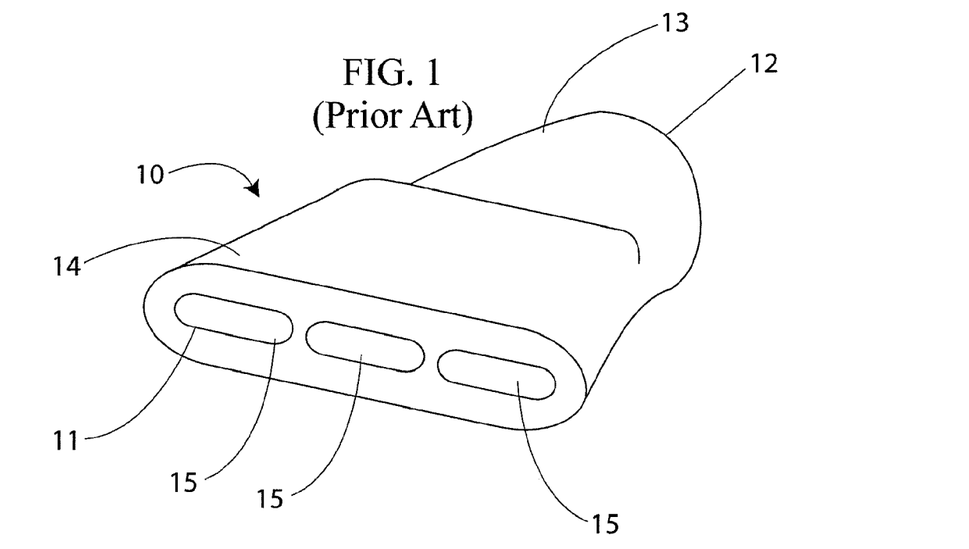
FIG. 1 is a perspective view of a prior art air cannon nozzle.

A prior art air cannon nozzle 10 is shown in FIG. 1 as comprising outlet port 11, inlet port 12, cylindrical inlet portion 13, and flattened, frusto-conical outlet portion 14. As shown in FIG. 1, outlet port 11 may include a plurality of openings 15, all in communication with an interior region of the nozzle. For high temperature environments, prior art air cannon nozzles are typically cast from a grade of steel suitable for sustained exposure to high temperatures, such as grade 310 stainless steel.

Figure 2:
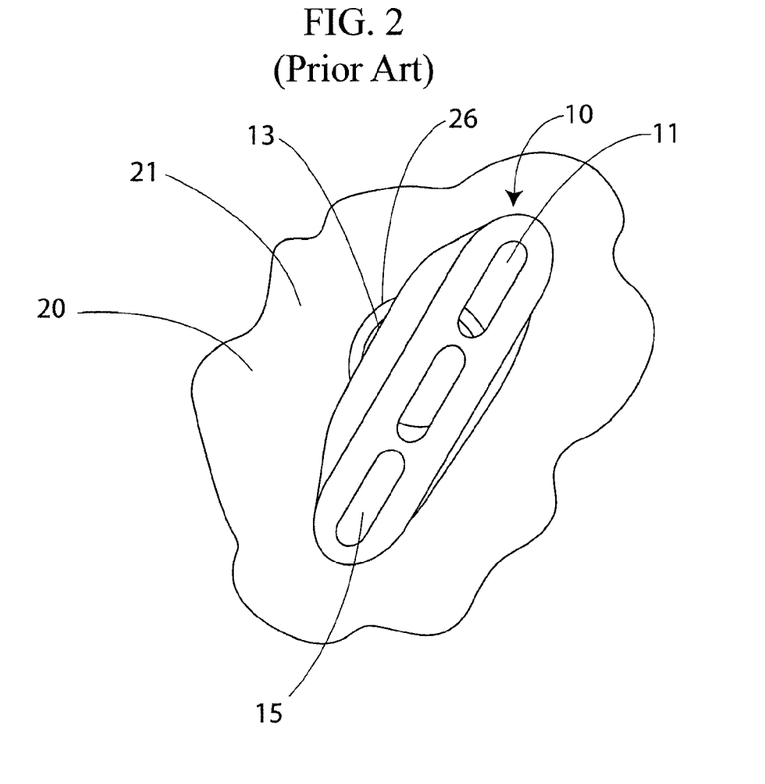
FIG. 2 is an elevated front view of a portion of a prior art air cannon nozzle, shown attached to and within the interior of a vessel.

Prior art air cannon nozzle 10 is further shown within the interior region of an associated industrial vessel 20 in FIG. 2. Outlet port 11 is directed towards the interior of the vessel, and cylindrical inlet portion 13 of the prior art air cannon nozzle extends beyond inner surface 21 of the vessel, through aperture 26 to the exterior of the vessel, where it may be welded to an extension pipe for fluid communication with an exhaust valve of an air cannon.

Such prior art air cannon nozzles are typically installed within an industrial vessel, such as a pre-heater tower used in the manufacture of cement, in the following manner. First, a desired location for the nozzle is determined, and an appropriately sized aperture is cut through the wall of the vessel. Next, a first individual, positioned inside of the vessel, holds the nozzle and positions it in a desired location and orientation while a second individual, positioned outside of the vessel, tacks the nozzle into place. Since the mounting and orientation of the nozzle may be critical, manual repositioning of the nozzle may be required to be performed several times in order to correctly orient the air cannon nozzle.

Figure 3:
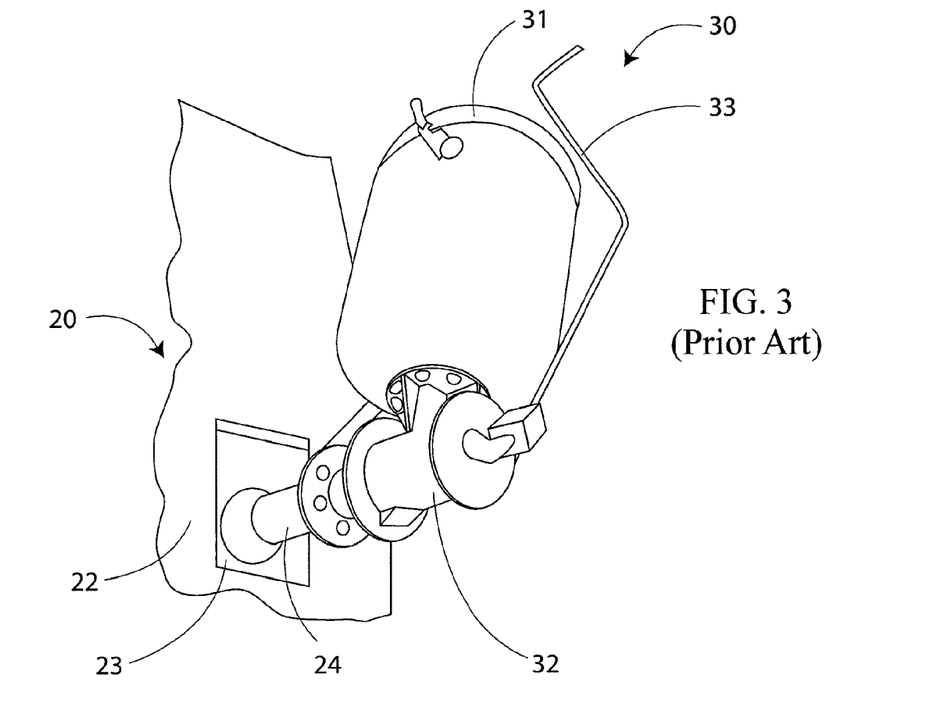
FIG. 3 is a perspective view of a portion of a prior art air cannon nozzle, shown attached to the exterior of a vessel, an extension pipe, and an air cannon.

Next, after the nozzle is correctly positioned; it is welded to the exterior surface of the vessel. As shown in FIG. 3, a seal plate 23, welded to exterior surface 22 of vessel 20, is commonly employed to provide an airtight seal between the exterior surface of the nozzle and the vessel, as the portion of nozzle which extends through the vessel is welded to a corresponding aperture of the seal plate. Next, as further shown in FIG. 3, an extension pipe 24 is then welded to the nozzle, such that the extension pipe and inlet port of the nozzle are in fluid communication. An air cannon 30, comprising a pressure tank 31 and exhaust valve 32, is then attached to an opposing end of the extension pipe 24, with an exhaust port of exhaust valve 32 in fluid communication with extension pipe 24. An air supply line 33 is then coupled to the air cannon.

Figure 4:
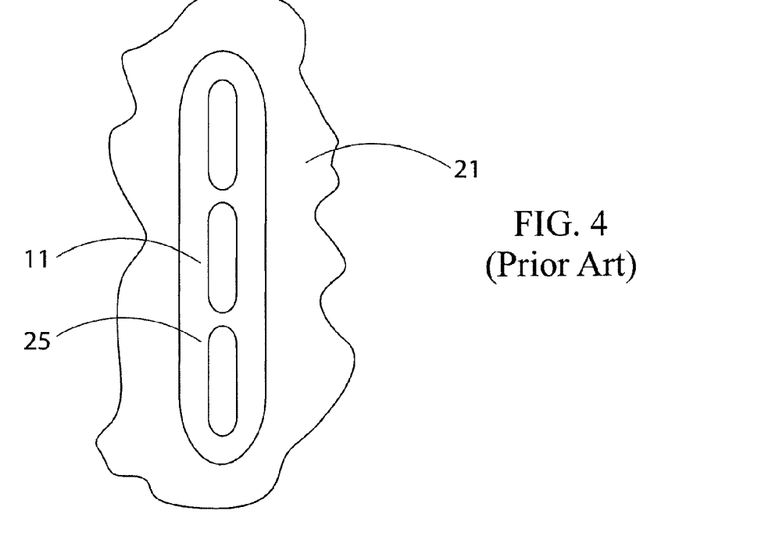
FIG. 4 is an elevated side front view of a portion of a prior art air cannon nozzle, shown within the interior of a vessel and covered with protective refractory material.

Within the vessel, in many high temperature applications, refractory brick material, often nine inches in thickness, is used to line the vessel. Accordingly, outlet port 11 of the air cannon nozzle typically extends approximately this distance into the interior surface of the vessel. As a final installation step of the nozzle, and as shown in FIG. 4, additional refractory material 25 is sprayed or poured around the nozzle and flush with the refractory lining, to protect the steel nozzle from the intense heat within the vessel.

Once installed, an air cannon nozzle will typically remain in place for a sustained period of time, during which the nozzles are subjected to temperatures of more than 2500 degrees Fahrenheit. During this period of time the temperatures and chemical reactions associated with various manufacturing processes can cause significant wear to the nozzles. As a result, during scheduled maintenance shutdowns, which may be annual shutdowns in the case of cement manufacturing plants, the worn nozzles are generally replaced. The process for replacing the prior art air cannon nozzles of FIGS. 1-4 is as follows:

First, air supply line 33 is removed from air cannon 30. Next, air cannon 30 is separated from extension pipe 24 and placed out of the way of maintenance personnel. A cutting torch is then employed to separate extension pipe 24 from inlet port 12 of prior art air cannon nozzle 10. Within the interior of the vessel, a jackhammer is employed to remove refractory material from the region surrounding nozzle 10. A cutting torch is again employed, this time to separate nozzle 10 from seal plate 23 and, in turn, from vessel 20. The worn prior art nozzle 10 is then removed, and replaced with a new prior art nozzle, in essentially the same manner described in detail above with respect to the initial installation of prior art air cannon nozzles. As will be appreciated, the removal of worn prior art air cannon nozzles, and their replacement with new nozzles, is a highly labor-intensive process.

A 2-piece air cannon nozzle assembly 40 of the present invention, having a replaceable nozzle portion, is shown in FIGS. 5-9 as including replaceable nozzle 50 and mount, or mounting member 80. Replaceable nozzle 50 includes refractory portion 60 and female collar 70. In a preferred embodiment, female collar 70 is preferably cast from a metallic material exhibiting adequate heat resistant qualities, including resistance to oxidation and thermal fatigue, and capable of withstanding cyclic heating, such as, for example, grade 310 stainless steel or the like. Refractory portion 60 is preferably constructed of a refractory material or a ceramic material that is the same as, or similar in heat resistant properties to, the refractory material lining the vessel, such as, for example, CERAMITE® CSA brand ceramic material, distributed in the United States by Whetstone Technology, LLC. The refractory or ceramic material of refractory portion 60 is poured around female collar 70 in a suitably-shaped mold, and is then allowed to harden in place to form the completed nozzle portion.

Figure 5:
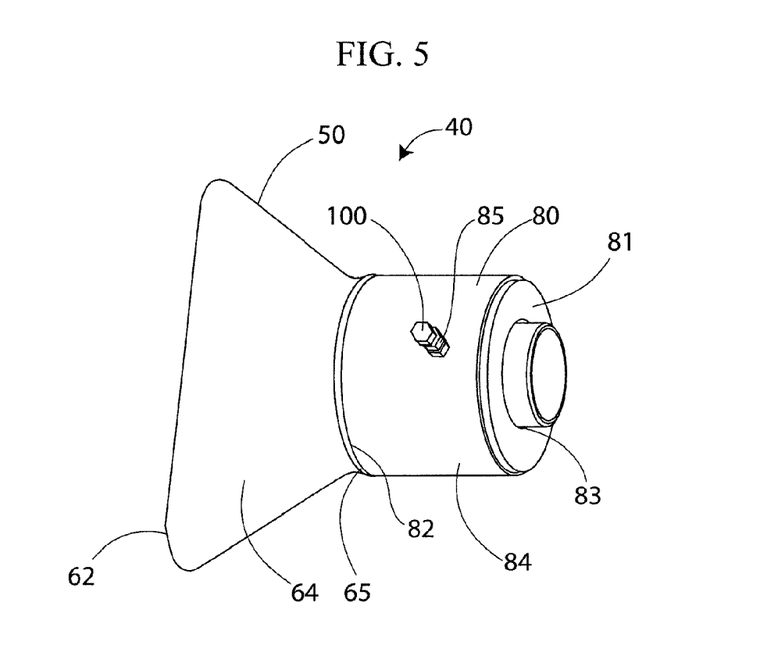
FIG. 5 is a perspective view of the present removable air cannon nozzle showing, in particular, the nozzle portion attached to the mount portion.
Figure 6:
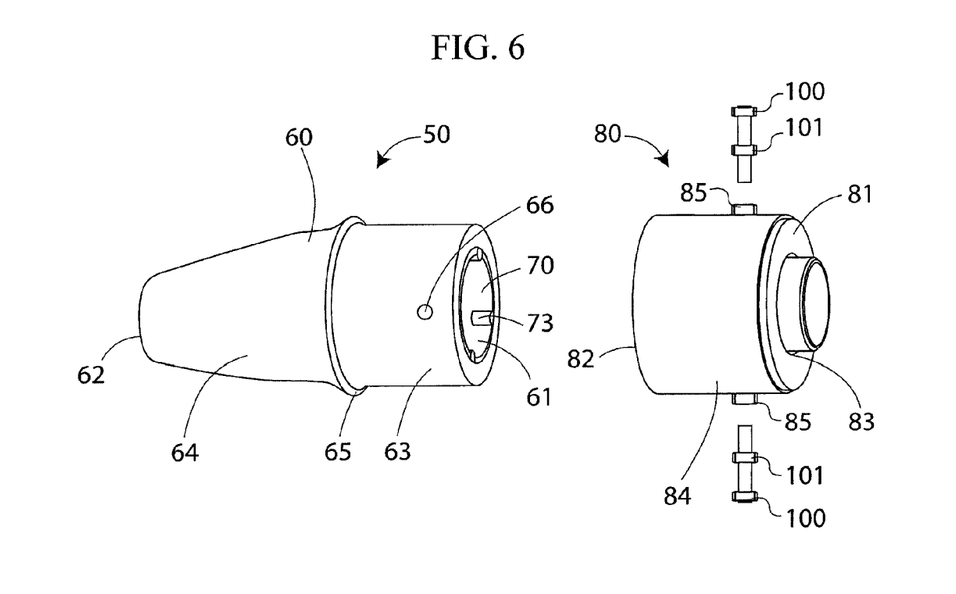
FIG. 6 is an exploded perspective view of the present removable air cannon nozzle.
Figure 7:
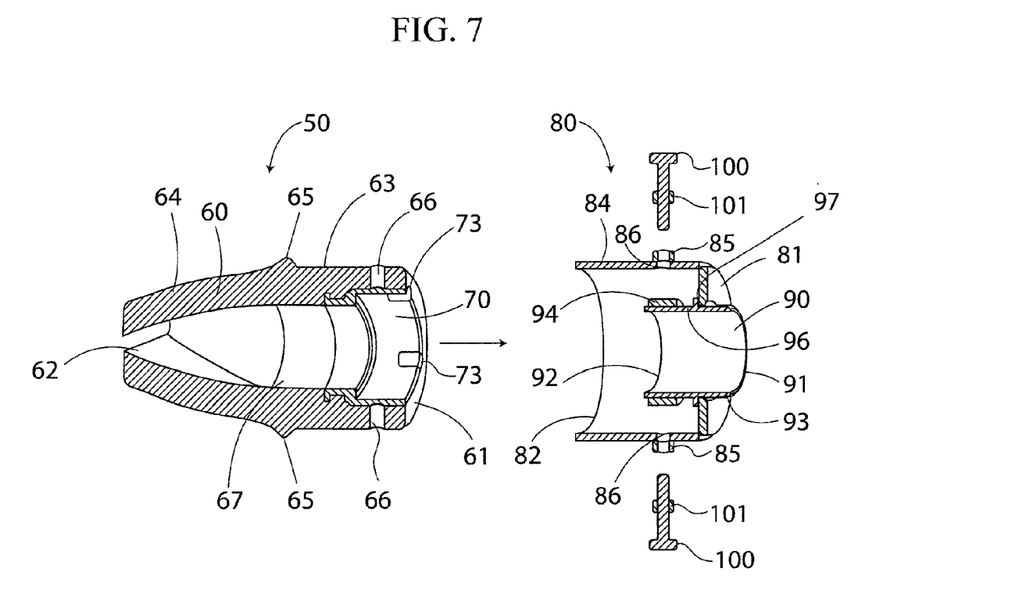
FIG. 7 is a cross-sectional exploded view of the present removable air cannon nozzle.

Refractory portion 60 of replaceable nozzle 50 includes interior chamber 67, communicating with inlet port 61 and outlet port 62. Annular stop ring 65 protrudes circumferentially about the outer surface of refractory portion 60. Refractory portion 60 further includes a substantially cylindrical inlet portion 63 extending from inlet port 61 to stop ring 65, and a substantially flattened frusto-conical outlet portion 64 extending from stop ring 65 to outlet port 62.

Figure 8:
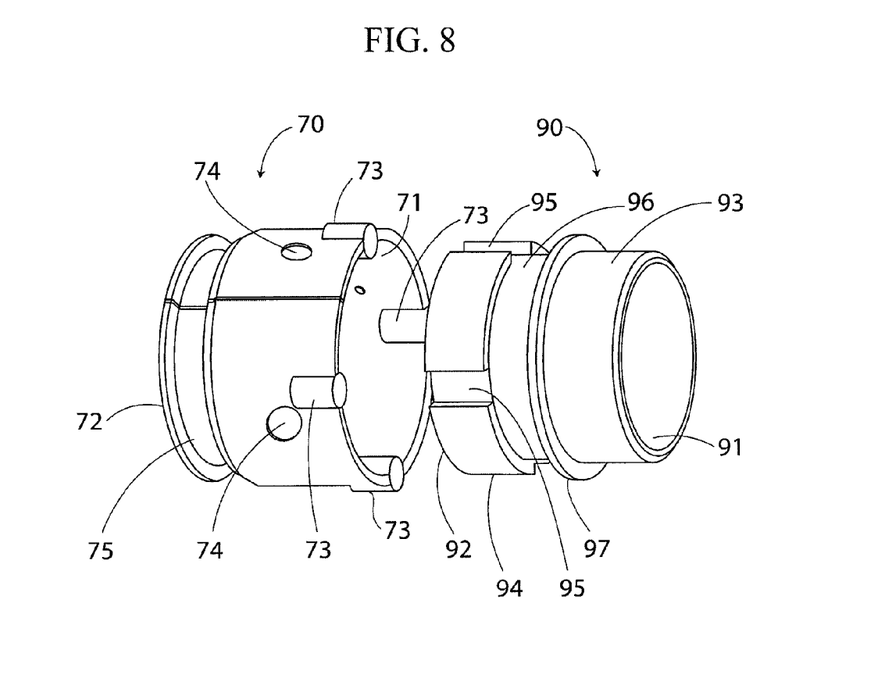
FIG. 8 is a perspective view of a portion of the present removable air cannon nozzle showing, in particular, the outer collar component of the nozzle portion and the inner collar component of the mount portion.

Female collar 70 is generally cylindrical in shape, and includes inlet port 71, outlet port 72, four inwardly-protruding boss members, or bosses 73 proximate inlet port 71, shallow seating regions 74 disposed in the outer surface of the collar between each boss 73, and indented band region 75. Indented band region 75 serves to facilitate secure bonding and attachment between female collar 70 and over-molded refractory portion 60, as axial forces are applied to the nozzle portion during manual fastening and unfastening operations, relative to the mounting member portion of the overall nozzle assembly.

Mount, or mounting member 80 includes flange ring 81 having a central aperture, and outer cylindrical body 84 extending from flange ring 81 to opposing aperture 82. Outer cylindrical body 84 includes two opposing bores 86. Each bore 86 has a corresponding female threaded nut 85 aligned therewith. Each female threaded nut 85 is securely attached to the outer surface of outer cylindrical body 84, such that the threaded aperture of the nut and the corresponding bore through outer cylindrical body 84 are in alignment. Moreover, each female threaded nut 85 threadedly receives an associated securing member, or bolt 100. As described in further detail below, once installed, bolt 100 serves to releasably maintain replaceable nozzle 50 in secure engagement with mounting member 80. A locknut 101 is threaded onto bolt 100 and serves to inhibit loosening of bolt 100 prior to its intended removal.

Mounting member 80 further includes male collar 90 carried internally within outer cylindrical body 84. Male collar 90 includes inlet port 91, outlet port 92, and cylindrical body 93 extending between the inlet and outlet ports. A raised annular band 94 is disposed circumferentially about cylindrical body 93 proximate outlet port 92. Four transverse longitudinal slots 95 are disposed at equally spaced intervals about raised annular band 94. An annular stop ring 97 is disposed circumferentially about cylindrical body 93, approximately midway between inlet port 91 and outlet port 92.

Figure 9:
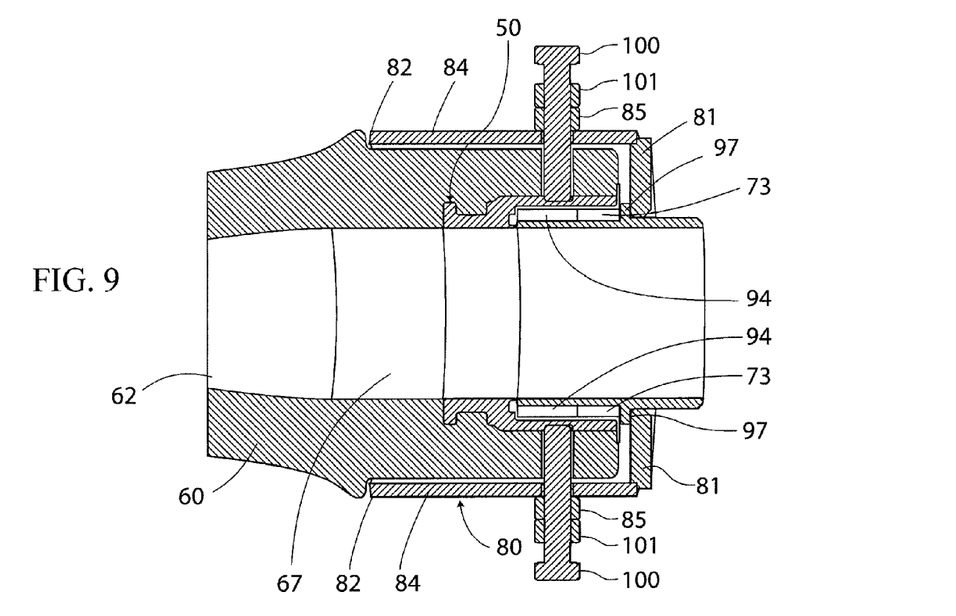
FIG. 9 is a fragmentary cross-sectional view of the present removable air cannon nozzle showing, in particular, the nozzle portion attached to the mount portion.

Male collar 90 is preferably constructed of a cast stainless steel or other material suitable for high temperature environments, such as grade 310 stainless steel or the like. Outer cylindrical body 84 may be constructed of commercially available stainless steel pipe, and has a diameter of approximately eight inches. Flange ring 81 is likewise formed of stainless steel. Moreover, male collar 80, outer cylindrical body 84, and flange ring 81 are preferably all welded together to form the overall mounting member 80. In particular, and as best seen in FIGS. 7 and 9, these three components are all welded together such that annular stop ring 97 is adjacent an interior surface of flange ring 81 about its central aperture, and the outer circumferential region of flange ring 81 abuts a side opening edge of outer cylindrical body 84. Moreover, female threaded nuts 85 are likewise welded in place to outer cylindrical body 84.

As best seen in FIGS. 8 and 9, replaceable nozzle 50 is releasably attachable to mounting member 80 through twist lock engagement of female collar 70 of replaceable nozzle 50 and male collar 90 of mounting member 80. Replaceable nozzle 50 is first gripped by its flattened, frusto-conical outlet portion 64 and manually advanced towards mounting member 80, with female collar 70 and make collar 80 coaxially aligned, and with each boss 73 of female collar 70 axially aligned with a cooperating slot 95 of male collar 90. Once bosses 73 contact annular stop ring 97, the flattened, frusto-conical outlet portion 64 and, in turn, the entirety of replaceable nozzle 50, is then manually rotated in either a clockwise or counterclockwise direction, until each threaded aperture 85 and bore 86 of mounting member 80 are aligned with a corresponding bore 66 and shallow seating region 74 of replaceable nozzle 50.

At this time, female collar 70 and male collar 90 are in twist-lock engagement, with bosses 73 releasably retained within annular race region 96, between band 94 and stop ring 97. To securely maintain this twist lock engagement, two opposing bolts 100 are threaded through corresponding female threaded nuts 85 and bores 66, until an end region of each bolt 100 is seated within a corresponding shallow seating region 74. Finally, locknuts 101 are tightened against corresponding threaded nuts 85 to maintain bolts 100 securely in position.

To separate an attached replaceable nozzle 50 from an associated mounting member 80, such as, for example, the substitution of a worn nozzle with a new replacement, the opposing locknuts 101 are first loosened, and the associated bolts 100 are likewise loosened or removed entirely, if desired. Next, the flattened, frusto-conical outlet portion 64 and, in turn, the entirety of replaceable nozzle 50, is manually rotated in either a clockwise or counterclockwise direction, until each boss 73 if female collar 70 aligns with a corresponding slot 95 of male collar 90. The application of an axial removal force may assist in obtaining this alignment. The replaceable nozzle 50 is then pulled axially away from engagement with mounting member 80 to fully separate replaceable nozzle 50 from mounting member 80. A new replaceable air cannon nozzle may then be releasably attached to mounting member 80 in the manner previously described.

Figure 10:
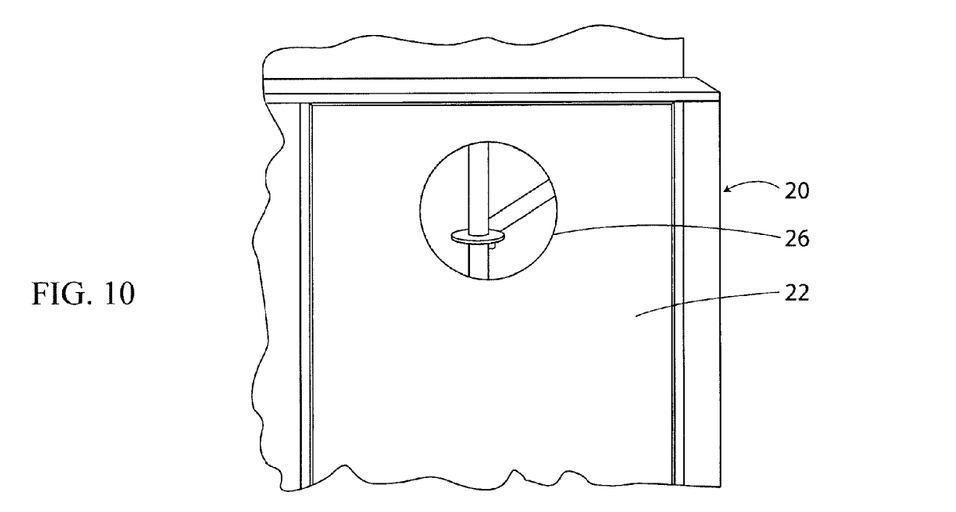
FIG. 10 is an elevated front view of a vessel prepared for attachment of the mount portion of the present removable air cannon nozzle.

The manner in which a mounting assembly and replaceable nozzle are initially attached to an industrial vessel will now be described. First, as shown in FIG. 10, a desired location for the nozzle is determined, and an appropriately-sized aperture 26, slightly larger than the outer diameter of mounting member 80, is cut through vessel 20 from exterior surface 22. Next, aperture 82 of mounting member 80 is advanced through aperture 26 of the vessel towards the interior of vessel 20. The distance that aperture 82 and, in turn, mounting member 80 is advanced into aperture 26 will be at least until aperture 82 is flush with interior surface 21 of vessel 20, but may include further advancement, depending upon the application. In particular, and as mentioned above, in many high temperature applications, refractory brick material of approximately nine inch in thickness may be used to line the inner surface of the vessel. In such instances, mounting member 80 will accordingly be advanced through aperture 26 until the innermost portion of outlet port 62 of replaceable nozzle 50, when the overall nozzle is in twist lock engagement with mounting member 80, is substantially flush with the inner surface of the refractory material used to line the vessel.

Figure 11:
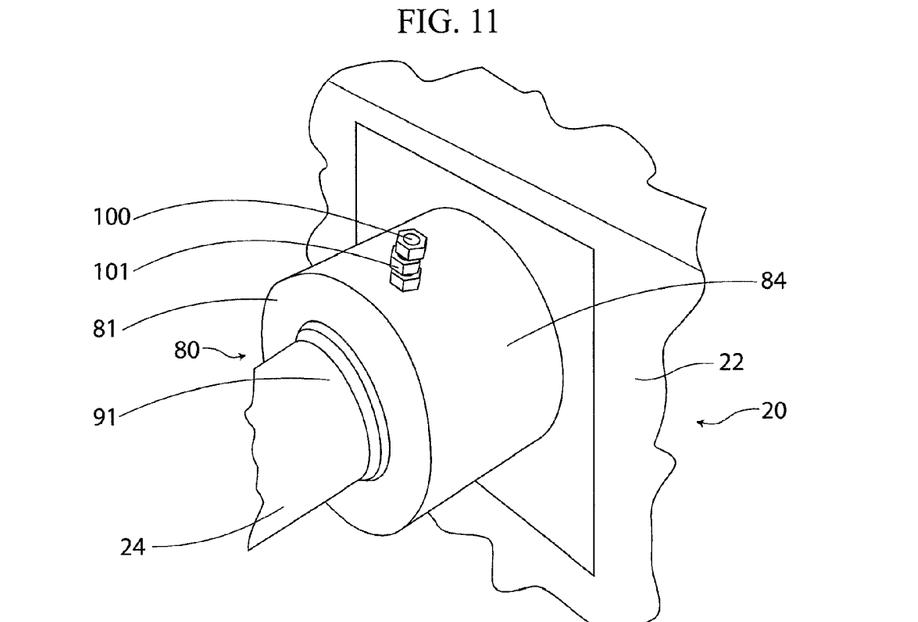
FIG. 11 is a perspective view of the present air cannon nozzle showing, in particular, the mount portion attached to the vessel.
Figure 12:
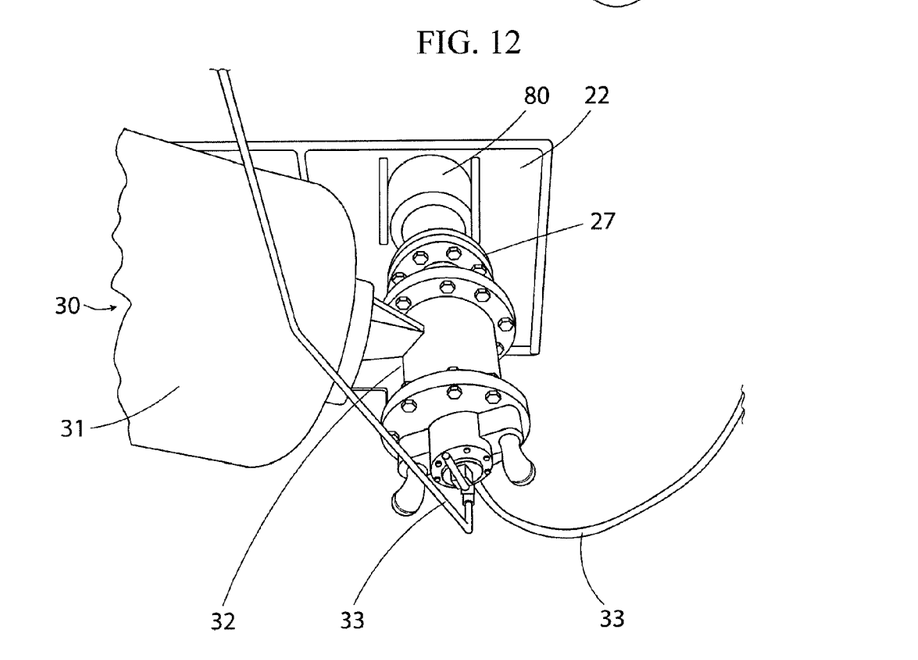
FIG. 12 is a perspective view of the present air cannon nozzle showing, in particular, the attachment of an air cannon to the mount.

Once mounting member 80 has been advanced the desired distance through aperture 26, it is welded in place to outer surface 22 of vessel 20, from outside of the vessel, and without requiring a second individual inside of the vessel to hold a nozzle in place, as is common practice with prior art, single-piece air cannon nozzles. Next, as shown in FIG. 11, extension pipe 24 is welded to inlet port 91 of male collar 90, and, as shown in FIG. 12, air cannon 30, including pressure tank 31 and exhaust valve 32, is attached to extension pipe 24 via an intermediate mounting flange 27. If desired, a thermal safety shield (not shown) may be interposed between mounting flange 27 and exhaust valve 32, to facilitate maintenance of air cannon valves in high temperature environments. Finally, air supply line 33 is coupled to the air cannon.

Once mounting member 80 has been installed in this manner, it may remain permanently attached to the exterior surface of the vessel. A new replaceable nozzle is then attached to the mounting member in the manner previously described, and refractory material is sprayed or applied around the nozzle such that the outlet port is substantially flush with the inner refractory lining surface of the vessel.

While it is anticipated that the refractory material coated replaceable nozzles of the present invention may last longer than prior art nozzles made solely of metal, it is still anticipated that the nozzles of the present invention will require periodic replacement. In general, it is anticipated that the nozzles of the present invention may need to be replaced only when the overall refractory lining material of the associated vessel likewise requires replacement.

At such times, jackhammers are typically employed to remove all of the refractory lining material from the vessel. Once the refractory lining material has been removed, bolts 100 and locknuts 101 can be loosened or removed from the outside of the vessel, and the worn nozzle may then be removed from the inside of the vessel, by release of the twist lock engagement, as previously described. Thereafter, a new, replacement nozzle may be twist locked into place from inside of the vessel, and further secured by tightening bolts 100 and locknuts 101 from outside of the vessel. Finally, once a new refractory lining has been put into place, additional refractory material may be sprayed or applied in the area surrounding the replacement nozzle, such that the outlet port of the nozzle is substantially flush with the refractory material.

As can be seen from the foregoing, the present replaceable air cannon nozzle can provide significant savings in the time expended and personnel required to periodically replace worn air cannon nozzles with new replacements. Unlike prior art air cannon nozzles, there is no requirement to remove an cannon, and its associated air line and extension pipe, in order to replace a worn nozzle. Nor is there any requirement to cut through the vessel wall in order to remove a worn nozzle, as with prior art air cannon nozzles. Moreover, since the mounting member of the present invention may remain in place indefinitely, a new replacement nozzle will always be installed in precisely the same position and orientation as the worn nozzle being removed, without the requisite personnel inside of the vessel to assist in positioning and orienting each newly-installed nozzle, as in the prior art.

While the present invention is described above in connection with preferred or illustrative embodiments, these embodiments are not intended to be exhaustive or limiting of the invention. Rather, the invention is intended to cover all alternatives, modifications and equivalents that may be included within its spirit and scope.

We claim:

1. A nozzle assembly for discharging a pressurized gas into an interior of a vessel, the nozzle assembly comprising:
   a mounting member fixedly attachable to a portion of the vessel, the mounting member having a collar and an outer body;
   a replaceable nozzle, the replaceable nozzle comprising a ceramic portion and a metal collar, the collar being overmolded by the ceramic portion in a manner such that the ceramic portion and the collar are securely locked together, the collar of the replaceable nozzle being releasably attachable to at least a portion of the mounting member from a position interior to the vessel, the replaceable nozzle having a converging gas passageway leading to an outlet port for discharging the pressurized gas into the interior of the vessel, the collar of the replaceable nozzle being releasably attachable to the collar of the mounting member, the outer body of the mounting member surrounding the collar of the replaceable nozzle and a portion of the ceramic portion of the replaceable nozzle;
   at least one of the mounting member and the replaceable nozzle having an inlet port for receiving the pressurized gas.

2. The nozzle assembly according to claim 1, wherein the collar of the replaceable nozzle and the collar of the mounting member are releasably attachable to each other by twist lock engagement.

3. The nozzle assembly according to claim 1, wherein at least one of the collar of the replaceable nozzle and the collar of the mounting member includes at least one boss member, and the collar of the other of the replaceable nozzle and the mounting member includes at least one slot and at least one race region, the at least one boss member, at least one slot, and at least one race region cooperating to releasably lock the replaceable nozzle to the mounting member.

4. The nozzle assembly according to claim 3, wherein the collar of the replaceable nozzle includes the at least one boss member and the collar of the mounting member includes the at least one slot and the at least one race region.

5. The nozzle assembly according to claim 4, wherein the collar of the replaceable nozzle is a female collar, and the collar of the mounting member is a male collar.

6. The nozzle assembly according claim 1, further comprising at least one securing member releasably securing the replaceable nozzle to the mounting member via the outer body of the mounting member.

7. The nozzle assembly according to claim 6, wherein the securing member is repositionable relative to the mounting member and replaceable nozzle from a securing position, wherein the replaceable nozzle is securedly attached to the mounting member, to a releasing position, wherein the nozzle is released from secure attachment to the mounting member.

8. The nozzle assembly according to claim 6, wherein the at least one securing member comprises at least one bolt threadedly received by at least a portion of at least one of the replaceable nozzle and the outer body of the mounting member.

9. A method of replacing a replaceable nozzle of a nozzle assembly, wherein the replaceable nozzle is disposed at least partially within an interior of a vessel, comprising the steps of:

accessing a nozzle assembly, the nozzle assembly having a mounting member fixedly attached to an exterior portion of the vessel and having a replaceable nozzle, the mounting member having an inlet port coupled to a source of pressurized gas, the replaceable nozzle comprising a converging gas passageway leading to an outlet port for discharging pressurized gas from the source of pressurized gas into the interior of the vessel and comprising a ceramic portion and a metal collar, the collar being overmolded by the ceramic portion in a manner such that the ceramic portion and the collar are securely locked together, at least a portion of the replaceable nozzle being disposed inside of the vessel, the replaceable nozzle being releasably attached to at least a portion of the mounting member via the collar, the mounting member including a collar and an outer body, the collar of the replaceable nozzle being releasably attached to the collar of the mounting member, the outer body surrounding the collar of the replaceable nozzle and a portion of the ceramic portion of the replaceable nozzle;

detaching the replaceable nozzle from the mounting member while leaving the mounting member fixedly attached to the exterior portion of the vessel and the source of pressurized gas by disengaging the collar of the replaceable nozzle from the mounting member by rotating the replaceable nozzle relative to the mounting member and thereafter pulling the replaceable nozzle completely into the vessel; and attaching a replacement nozzle to the mounting member.

* * * * *